United States Patent [19]
Jorgensen et al.

[11] Patent Number: 5,671,135
[45] Date of Patent: Sep. 23, 1997

[54] PROGRAMMABLE CONTROLLER MODULE

[75] Inventors: Glen Jorgensen, Marlboro; Don Barry, Norwood, both of Mass.

[73] Assignee: ZymeQuest, Inc., Mass.

[21] Appl. No.: 477,422

[22] Filed: Jun. 7, 1995

[51] Int. Cl.$^6$ ................................................ G05B 11/01
[52] U.S. Cl. ............................................ 364/181; 364/188
[58] Field of Search .................................. 364/140–142, 364/146, 180, 181, 184, 185, 187, 188, 413.01, 550–551.02, 424.05, 413.07–413.09; 318/591; 315/194, 307; 340/600, 641, 642, 644, 679–685, 825.06, 825.17, 825.18, 825.69

[56] References Cited

U.S. PATENT DOCUMENTS 4,236,594  12/1980  Ramsperger ................... 364/424.05
5,008,865   4/1991  Shaffer et al. ....................... 315/194

*Primary Examiner*—Reba I. Elmore
*Assistant Examiner*—Steven R. Garland
*Attorney, Agent, or Firm*—Brumbaugh, Graves, Donohue & Raymond

[57] ABSTRACT

The present invention relates to a programmable control module that may be connected to existing instrumentation in order to automate manual operations and/or perform new sequences of functions. As one specific example, the present invention provides for a programmable control module that may be connected to a commercial cell washing machine, and which directs the automatic performance of steps required to enzymatically deantigenize erythrocytes. There are a number of advantages associated with the present invention. Valuable non-automated or semi-automated instruments may be rendered programmable by an add-on control module, thereby increasing the reproduciblity of function while reducing manpower requirements and avoiding the consequences of human error. Furthermore, the control module may be additionally connected to auxiliary devices which improve the function of the host instrument, including, for example, pumps, valves, or sensors (including safety monitoring devices).

12 Claims, 2 Drawing Sheets

PROGRAMMABLE CONTROLLER MODULE

SPECIFICATION

1. Introduction

The present invention relates to a programmable module that may be used to control the operation of an apparatus which has hitherto required manual operation.

2. Background of the Invention

There exists a large installed base of expensive laboratory and industrial instruments, such as cell washing centrifuges, fermentors, and manufacturing equipment, that were designed before the advent of microprocessor control. While these instruments may perform useful functions, their use is labor intensive and prone to human error due to the often tedious manual steps required for their operation. In some cases there may be newer automated versions of such instruments, but in many cases replacement is neither practical nor economical.

Moreover, a problem arises where it is desirable for a more sophisticated process to be practiced in a reproducible manner using an apparatus designed to perform a simpler function. For example, patented methods have been developed for removing type A and type B antigens from erythrocytes, thereby improving the transfusability of blood. Such methods, as set forth in U.S. Pat. Nos. 4,330,619, 4,427,777, and 4,609,227, require that erythrocytes be sequentially combined with various buffer and enzyme solutions. In order to ensure that the resulting blood product is suitable for transfusion, the conversion methods are desirably practiced under conditions that avoid microbial contamination. Instruments currently available in blood centers are not capable of automatically executing such conversion processes. The training of operators to safely and reproducibly perform the required steps would likely be time-consuming and expensive, and could potentially result in variability in the quality of the blood product. Therefore, it would be desirable to provide a means for automating the execution of such a process by currently available laboratory equipment. Such means would enable the practice of the new process without requiring instrument replacement.

SUMMARY OF THE INVENTION

The present invention relates to a programmable control module that may be connected to existing instrumentation in order to automate manual operations and/or perform new sequences of functions.

In a nonlimiting specific embodiment, the present invention provides for a programmable control module that may be connected to a commercial cell washing machine, and which directs the automatic performance of steps required to enzymatically deantigenize erythrocytes.

There are a number of advantages associated with the present invention. Valuable non-automated or semi-automated instruments may be rendered programmable by an add-on control module, thereby increasing the reproducibility of function while reducing manpower requirements and avoiding the consequences of human error. Furthermore, the control module may be additionally connected to auxiliary devices which improve the function of the host instrument, including, for example, pumps, valves, or sensors (including safety monitoring devices).

DETAILED DESCRIPTION OF THE INVENTION

The present invention relates to a general purpose control module that may be directly or remotely connected to pre-existing instrumentation in order to automate a manual operation and/or perform new sequences of functions. In various embodiments, the present invention provides for the control module, either separate from or in combination with the host instrument.

The pre-existing instrument is referred to herein as the "host instrument". Suitable host instruments include, but are not limited to, centrifuges, fermentors, and related apparatus used in cell culturing or cell preparation, medical diagnostic equipment, optical inspection devices, machining centers, injection molding apparatus, etc. In a preferred, nonlimiting specific embodiment of the invention, the host instrument is a cell washing apparatus such as a Cobe 2991 Blood Cell Processor. Host instruments may be either non-automated (that is to say, they require manual operation to initiate function) or semi-automated (wherein at least some manual operation is necessary).

The control module comprises a programmable microprocessor that is used to provide a method of controlling the sequence of operation of the host instrument, as well as a means for interfacing with the host instrument. In addition to automating one, some, or all of the pre-existing functions of the host instrument, the control module may further be connected to one or more auxiliary devices, such as pumps, valves, or sensors, that allow new uses of the host instrument.

Figure 1:
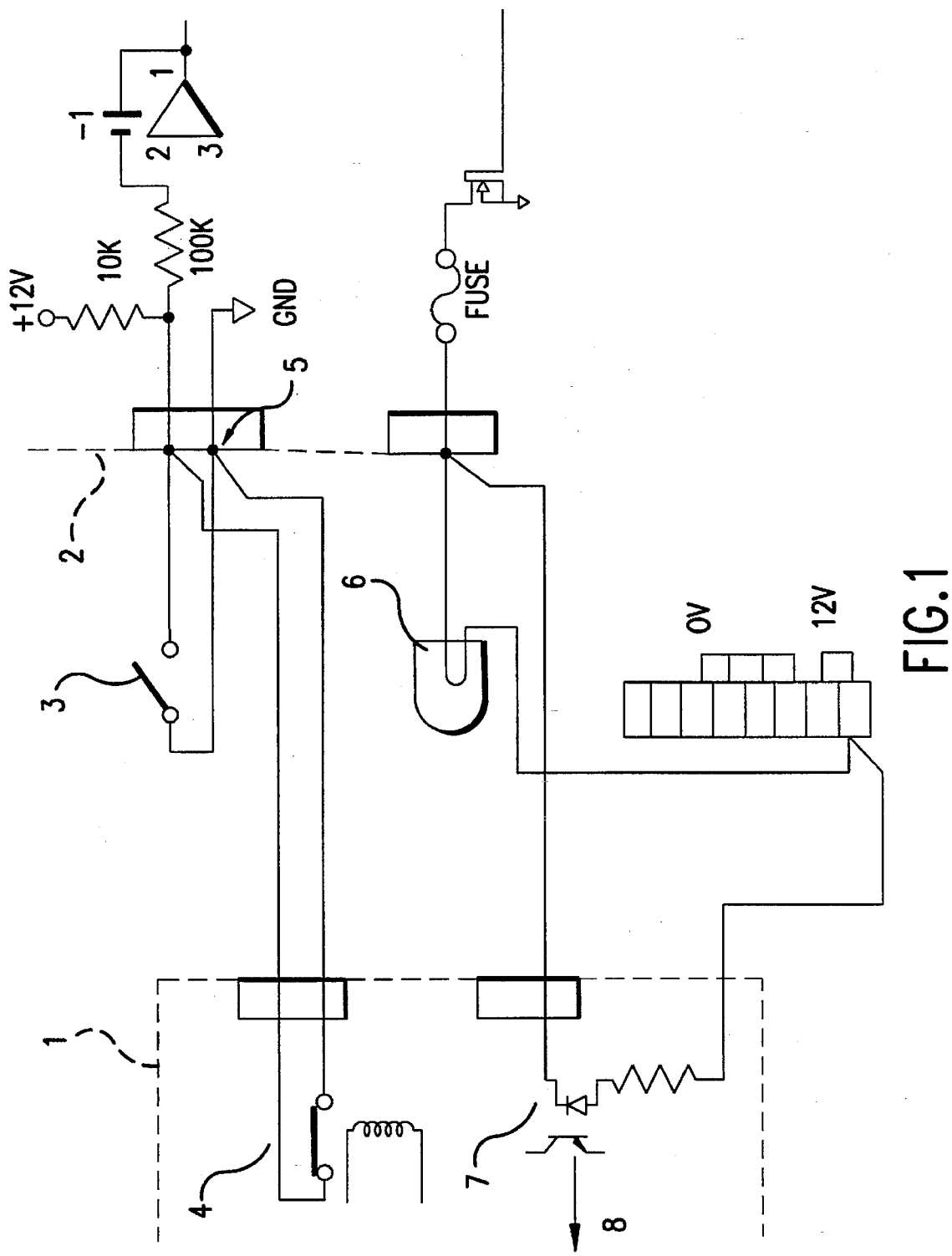
FIG. 1 depicts typical connections established between the control module (1) and the host instrument (2). Where the host instrument contains a switch (3), the control module may comprise an electromagnetic relay (4), which may be connected in parallel with the switch contacts (5). Where the host instrument contains an annunciator lamp (6) the control module may comprise an optocoupler device (7), which may be connected across the annunciator lamp and then connected to an input port on the microprocessor (8) of the control module.

A common feature of non-automated host instruments is the use of switches or pushbuttons which may be manually actuated by an operator in order to access the functions of the instrument. In addition, there are often annunciator lamps that create a visual signal to the operator which provides information regarding the instrument's current state of operation. According to the present invention, these switches, pushbuttons, and lamps may be utilized as means for creating an interface between the host instrument and the control module. For example, as diagrammed in FIG. 1, although there may be a wide variety of switch types (3) used in the host instrument (2), an electromagnetic relay (4) of the proper rating may be connected across (in parallel with) the switch contacts (5). Because this relay may be controlled by the control module, the switch may be actuated as if an operator were pressing a button. In a similar manner, an electronic optocoupler device (7) may be connected across an annunciator lamp (6) and then connected to an input port on the microprocessor (8) of the control module (1), thereby allowing the control module to monitor the operation of the host instrument as if an operator were watching the lamps. The manner of the interface between the host instrument and the control module has the added advantage that it need not preclude some or all manual operation of the host instrument.

According to the invention, the control module comprises a host instrument interface, a microprocessor, an operator interface connection to an operator keypad and display, and a connection to remote communications. The control module may further comprise a local peripheral interface. The host instrument interface, an embedded microprocessor, local peripheral interface, and operator interface may be connected via a "control board".

The host instrument interface provides an electrical connection to the host instrument control panel. For an input from a host instrument annunciator lamp, a corresponding optically isolated signal receiver may be used to convert the status of an annunciator light to a digital bit that may be queried by the embedded microprocessor. By the proper selection of input resistors and, in certain circumstances, as when connected to an alternating voltage annunciator, a diode bridge, an interface may be established to a wide range of possible lamp voltages, while maintaining electrical isolation between the host instrument and the controller. For a switch of a control panel of the host instrument, a corresponding electromechanical relay may be created. The contacts of the relay may be wired in parallel across the contacts of the host instrument switch, while the energizing coil of the relay may be connected to a digital bit that is supplied by the embedded microprocessor. By proper selection of relays and, under certain circumstances, as when the host control panel switches consist of both normally open and normally closed contacts using two relays per host instrument switch to allow for the control of host instruments that implement control functions by either opening or closing the electrial circuits. In this manner, an interface to a wide variety of switch types and ratings may be established. Using the embedded microprocessor to control the relays, the actions of an operator opening or closing a control switch on the host instrument panel may be simulated.

An embedded microprocessor, according to the invention, comprises a central processing unit, RAM memory, EPROM memory, battery backed up RAM, oscillator clock, and various circuitry required to perform the general functions of a software programmable controller. Programmed instructions may be stored in the EPROM memory, while dynamic calculations may be performed using the RAM memory. In preferred embodiments, a two kilobyte parameter storage memory that is non-volatile by virtue of an internal battery system may be comprised in the microprocessor. Such a battery RAM may be used to store various process variables, operator selections, and calibration coefficients when the power is shut off.

A local peripheral interface may comprise circuitry used to interface the embedded microprocessor to any additional apparatus, such as a pump, a motor, or multiple such instruments, that may be used to supplement the operation of the host instrument. The local peripheral interface may also comprise an interface for a sensor used to monitor a process variable.

An operator keypad and display may comprise circuitry used to display information to the operator via, for example, a liquid crystal display screen, and may receive operator commands and process data from a key pad.

A connection to remote communications may comprise circuitry used to interface the embedded microprocessor to another computer system, using standard protocols such as RS232, that may be used to collect process data or to provide coordinated commands between several instruments that are in fluid communication.

A program that logically initiates a desired sequence of output signals may be programmed into the embedded microprocessor resident on the controller board, which may be powered by a low voltage (for example, a 5 volt) power supply. The program may possess a timer which counts or times a sequence of operational steps. Such a programmed response typically is experimentally determined. Once initiated by an operator, the programmed response is preferably independent of the operator, and is, therefore, exactly repeatable and free of typical user errors.

In order to provide a more detailed explanation of the invention by way of example, but not by way of limitation, the following description of a specific embodiment of the invention is provided, wherein a control module is connected to a Cobe 2991 cell washing apparatus in order to effect enzymatic conversion of erythrocytes from the type B to the type O phenotype.

The enzymatic conversion process includes up to seventeen separate buffering and washing steps that require the addition of fresh solution to a packed mass of erythrocytes, thorough mixing of the erythrocytes with the solution, centrifugation to separate the solution from the erythrocytes, and then expression of the resulting supernatant into a waste container. To produce a preparation of erythrocytes suitable for transfusion, all blood contacting surfaces are desirably sterile. The control module of the invention has simplified the practice of the conversion method by rendering a standard laboratory apparatus, previously used only for washing blood cells, capable of performing the conversion process without an operator present. According to the invention, the mechanical system (e.g. centrifuge, valves, and hydraulic expressor) of the host instrument, as well as various auxiliary devices (e.g., a pump, valves, and pressure sensors) are all controlled by a control board with an embedded microprocessor, related circuitry and interconnecting wiring harnesses to receive a multiplicity of input signals and to send a multiplicity of output signals.

Figure 2:
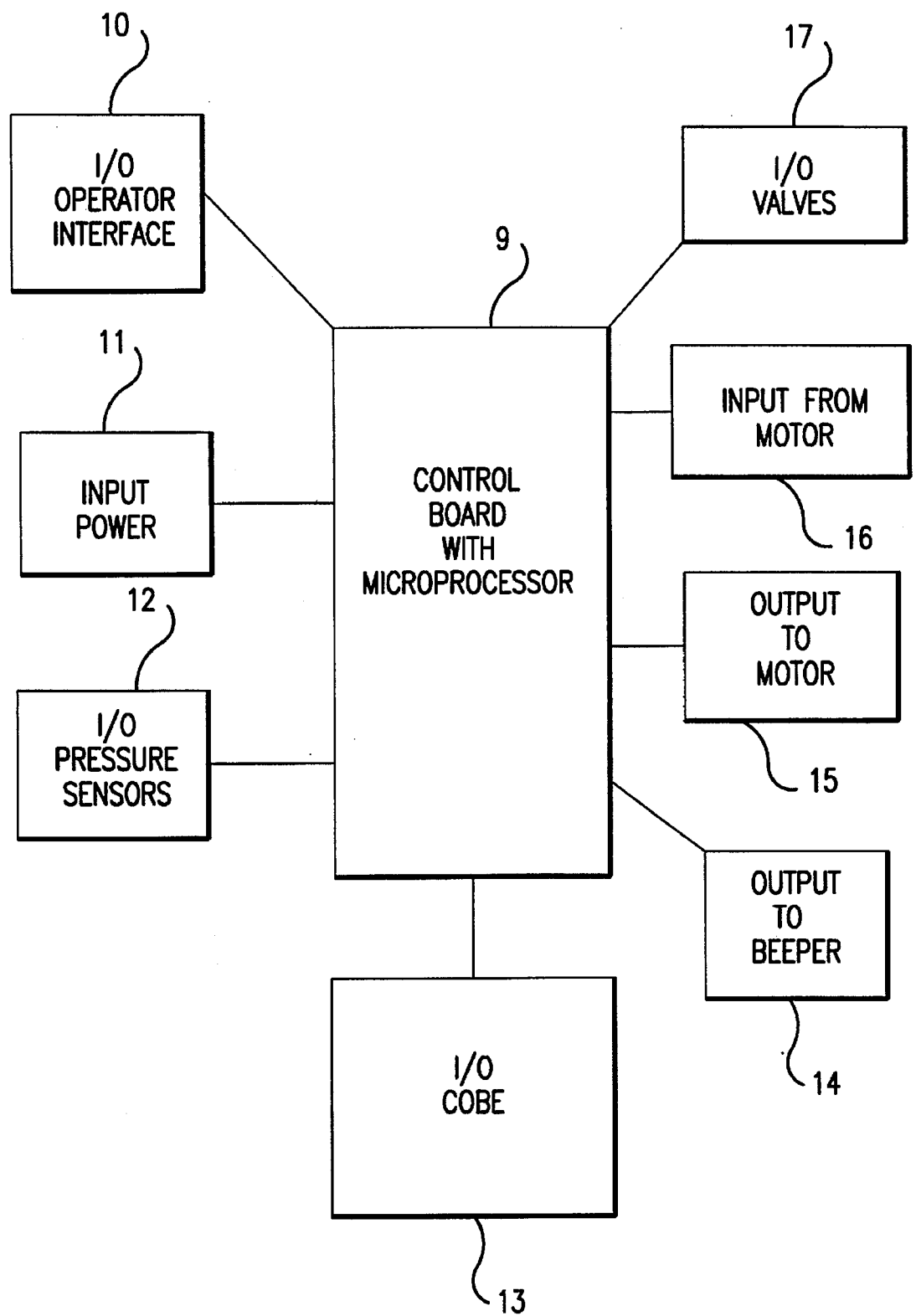
FIG. 2 depicts a diagram of the relationship between a Cobe 2991 apparatus and a control module according to the invention, via a control board (9) of the control module. The control board (9) provides connections between: input and ouput from/to ("I/O") an operator interface (10) which, in turn, is connected to an operator keypad and display; input power (11) (e.g., 110 v) whcih is broken down into voltages as required (e.g., I15 V, I5 V); I/O from/to pressure sensors (12); I/O from/to the Cobe 2991 apparatus (13; the host instrument interface); output to a audible signaling device which is used to audibly signal the operator that operator intervention is required, for example, to correct a fault causing an overpressure warning or to signal the end of the protocol (14); output to a motor (15) used to drive a peristaltic pump; input from a Tach signal from the motor (16) regarding e.g. the rate and direction of rollers in the pump; and I/O from/to valves (17) attached to the control module and auxiliary to the Cobe 2991 apparatus.

The following describes the relationship between the Cobe 2991 apparatus and the control module. A diagram of this relationship is depicted in FIG. 2.

Input signals are received from either an auxiliary device connected to the control module or the host instrument via a host instrument interface (13). Input from the host is effected by connecting optoisolators on the control board across the backlit switch lamps on the control panel of the Cobe 2991 apparatus via an interconnecting wiring harness.

In addition to its connection to the Cobe 2991 host instrument (13), the control module is connected to a peristaltic pump and drive motor (15, 16) in order to facilitate the pumping of buffering and washing solutions. The drive motor is designed to precisely control the rate of delivery of fluid and to provide feedback to the control board regarding the rate and direction of rotation of the rollers in the pump.

The control module is also connected to at least two pressure sensors (12) which are capable of detecting undesirable, and possibly dangerous, increases in pressure in the conversion system. One sensor is positioned to detect increases in pressure in the tubing used to provide wash or buffer solutions; the other sensor is positioned to detect increases in pressure in the region of the centrifuge chamber of the Cobe 2991 host instrument. Pressure data from the sensors (12) is transmitted to the embedded microprocessor which is programmed to modify or abort operation of the instrument once a particular pressure threshold is reached.

The conversion process requires a pump to move fluid from either of two different bags of solutions to either a bag of packed erythrocytes or directly into a centrifugal processing bag. In order to control the source and destination of the fluids, three valves (17), auxiliary to the Cobe 2991 host instrument, have been connected (17) to the control module. In addition, the control module also directs the function of four valves located in the Cobe 2991 host (via the host instrument interface (13)) instrument to control 1) erythrocytes entering from the source blood bag; 2) wash solution entering the compartment containing erythrocytes; 3) supernatant expressed into the waste bag; and 4) converted erythrocytes expressed into a storage bag.

Accordingly, input from the control module includes data entry from the keypad (10), digital signals from the pump motor encoder (16) indicating speed and direction of the motor, the state of the switch on a valve (17) which indicates whether the valve is open or closed, and digital input from the pressure transducer (12). All are interconnected to the control board (9) through wiring harnesses. The control board can output signals to either the host instrument (13) or to one or more auxiliary devices attached to the control module. Output to the host instrument may be from miniature relays that are also in the control board to existing switches on the panel of the Cobe 2991 apparatus through an interconnecting wire harness. This connection may be used to either enable or disable the centrifuge portion of the Cobe 2991 host instrument, any valve, and/or the expressor pump. Output to auxiliary devices connected to the control module may be a digital signal to a +24 volt power supply in order to energize or de-energize the pump motor or the valves via an interconnecting wire harness. The digital signal to a 5 volt power supply also outputs a preprogrammed message from the embedded microprocessor on the control board to the single line display which is connected to an interface card via an interconnecting harness and is powered by a low voltage power supply.

Various publications are cited herein, which are hereby incorporated by reference in their entirety.

What is claimed is:

1. A programmable control module for automatically performing an operation using a host instrument having a switch subject to manual operation, comprising the following elements:

(i) a host instrument interface comprising an electromagnetic relay connected in parallel with a switch contact on the host instrument;
    (ii) an operator interface; and
    (iii) a programmable microprocessor;
    wherein the microprocessor may be programmed by an operator via the operator interface such that the switch of the host instrument may be actuated automatically via the electromagnetic relay comprised in the host instrument interface, as if the switch were being manually operated, thereby automatically performing the operation, wherein the host instrument is a cell washing apparatus.

2. A programmable control module for automatically performing an operation using a host instrument having a switch subject to manual operation, comprising the following elements:

(i) a host instrument interface comprising an electromagnetic relay connected in parallel with a switch contact on the host instrument;
    (ii) an operator interface;
    (iii) a programmable microprocessor; and
    (iv) a local peripheral interface comprising a connection to an auxiliary device;
    wherein the microprocessor may be programmed by an operator via the operator interface such that the switch of the host instrument may be actuated automatically via the electromagnetic relay comprised in the host instrument interface, as if the switch were being manually operated, thereby automatically performing the operation; wherein the microprocessor may be programmed to control the function of the auxiliary device via the local peripheral interface; and, wherein the host instrument is a cell washing apparatus.

3. The programmable control module of claim 2, wherein the local peripheral interface is connected to a peristaltic pump.

4. The programmable control module of claim 3, wherein the local peripheral interface is further connected to a pressure sensor.

5. A programmable control module for detecting the activation of an annunciator lamp of a host instrument which upon activation produces a visual signal, comprising the following elements:

(i) a host instrument interface comprising an electronic optocoupler connected across the annunciator lamp of the host instrument;
    (ii) an operator interface; and
    (iii) a programmable microprocessor;
    wherein the microprocessor may be programmed by an operator via the operator interface such that an electronic signal is transmitted by the optocoupler to the microprocessor if the annunciator lamp is activated, thereby providing information to the microprocessor as if a human operator were watching the lamp and received a visual signal, wherein the host instrument is a cell washing apparatus.

6. A programmable control module for detecting the activation of an annunciator lamp of a host instrument which upon activation produces a visual signal, comprising the following elements:

(i) a host instrument interface comprising an electronic optocoupler connected across the annunciator lamp of the host instrument;
    (ii) an operator interface;
    (iii) a programmable microprocessor; and
    (iv) a local peripheral interface comprising a connection to an auxiliary device;
    wherein the microprocessor may be programmed by an operator via the operator interface such that an electronic signal is transmitted by the optocoupler to the microprocessor if the annunciator lamp is activated, thereby providing information to the microprocessor as if a human operator were watching the lamp and received a visual signal; wherein the microprocessor may be programmed to control the function of the auxiliary device via the local peripheral interface; and, wherein the host instrument is a cell washing apparatus.

7. The programmable control module of claim 6, wherein the local peripheral interface is connected to a peristaltic pump.

8. The programmable control module of claim 7, wherein the local peripheral interface is further connected to a pressure sensor.

9. A programmable control module for (a) automatically performing an operation using a host instrument having a switch subject to manual operation, and (b) detecting the activation of an annunciator lamp of the host instrument which upon activation produces a visual signal, comprising the following elements:

(i) a host instrument interface comprising an electromagnetic relay connected in parallel with a switch contact on the host instrument and an electronic optocoupler connected across the annunciator lamp of the host instrument;

(ii) an operator interface; and (iii) a programmable microprocessor;

wherein the microprocessor may be programmed by an operator via the operator interface such that the switch of the host instrument may be actuated automatically via the electromagnetic relay comprised in the host instrument interface, as if the switch were being manually operated, and an electronic signal is transmitted by the optocoupler to the microprocessor if the annunciator lamp is activated, thereby providing information to the microprocessor as if a human operator were watching the lamp and received a visual signal, wherein the activation of the annunciator lamp and the actuation of the switch may be coordinated to occur in a desired sequence by the microprocessor, thereby automatically performing the operation, wherein the host instrument is a cell washing apparatus.

10. A programmable control module for (a) automatically performing an operation using a host instrument having a switch subject to manual operation, and (b) detecting the activation of an annunciator lamp of the host instrument which upon activation produces a visual signal, comprising the following elements:

(i) a host instrument interface comprising an electromagnetic relay connected in parallel with a switch contact on the host instrument and an electronic optocoupler connected across the annunciator lamp of the host instrument;

(ii) an operator interface;

(iii) a programmable microprocessor; and (iv) a local peripheral interface comprising a connection to an auxiliary device;

wherein the microprocessor may be programmed by an operator via the operator interface such that the switch of the host instrument may be actuated automatically via the electromagnetic relay comprised in the host instrument interface, as if the switch were being manually operated, and an electronic signal is transmitted by the optocoupler to the microprocessor if the annunciator lamp is activated, thereby providing information to the microprocessor as if a human operator were watching the lamp and received a visual signal, wherein the activation of the annunciator lamp and the actuation of the switch may be coordinated to occur in a desired sequence by the microprocessor, thereby automatically performing the operation; wherein the microprocessor may be programmed to control the function of the auxiliary device via the local peripheral interface; and wherein the host instrument is a cell washing apparatus.

11. The programmable control module of claim 10, wherein the local peripheral interface is connected to a peristaltic pump.

12. The programmable control module of claim 11, wherein the local peripheral interface is further connected to a pressure sensor.

* * * * *